Patented Aug. 21, 1951

2,565,317

UNITED STATES PATENT OFFICE 2,565,317

DILATABLE SEALING ELEMENTS

Glennard R. Lucas, Pittsfield, Mass., and Richard C. Bryan, Hawthorne, N. Y., assignors to General Electric Company, a corporation of New York No Drawing. Original application August 17, 1946, Serial No. 691,403. Divided and this application August 3, 1949, Serial No. 108,422

4 Claims. (Cl. 260—34.2)

This invention relates to dilatable sealing elements and their manufacture by extrusion of polyvinyl chloride plastic compositions which are readily extruded and yet capable of affording rigid, tightly-gripping sealing elements; and to a method of sealing openings with such elements.

This application is a division of our copending application Serial No. 691,403, filed August 17, 1946, and assigned to the same assignee as the present invention. The claims of the present application are directed to the manufacture of the elements.

The sealing elements may be in the form of tubes for connecting lengths of, for example, tubing formed of other plastic material, or of glass, metal, etc.; lengths of tubes sealed at one end for securely closing the ends of tubing or pipe; closures for bottles, etc.; or any other configuration which might be employed as a dilatable sealing element.

After extrusion to the desired shape, the elements are expanded by immersion in a dilater liquid which penetrates the polyvinyl chloride plastic, causing the element to soften slightly and expand, thus facilitating placing the elements on the tubes, bottles, etc., which it is desired to seal. The composition of the dilater liquid will hereinafter be described in more detail. After the sealing elements are in place, the dilater is allowed to escape either slowly at room temperature and prevailing atmospheric pressure, or more rapidly at elevated temperatures or reduced pressure or a combination of both conditions. Escape of the dilater causes the sealing elements to shrink to the final desired dimensions and grip tightly the openings of the tubes or other shapes to which they have been applied.

Heretofore it has been well known to extrude polyvinyl chloride compositions containing appreciable quantities of plasticizers such as tricresyl phosphate, dioctyl phthalate, and other high boiling compounds compatible with and capable of plasticizing polyvinyl chloride resins. The addition of these plasticizers to polyvinyl chloride has been necessary to produce compositions which are extrudable at temperatures below the decomposition temperature of the polyvinyl chloride and which are capable of affording tough, well-knit, extruded shapes. Because of the relatively high softening point of polyvinyl chloride, it has been necessary in the past to work the plasticizer and resin into an extrudable material by means of masticating rolls, and to sheet the resulting rubbery plastic mass. The plastic sheet must then be shredded in order to be handled in subsequent extrusion operations.

In many applications, the presence of the normally appreciable quantities of plasticizer in the final extruded polyvinyl chloride shapes is very undesirable. Thus, when conventional, highly plasticized polyvinyl chloride compositions are employed in the manufacture of extruded sealing elements, the rigidity of the final sealing element may not be sufficient to afford the desired security in the seal. Furthermore, because of the nature of the dispersion of ordinary plasticizers in the polyvinyl chloride resin, there is a tendency for sealing elements to become more pervious as plasticizer is leached out by the dilater liquid.

It is, therefore, one of the objects of this invention to provide a method for the manufacture of dilatable polyvinyl chloride plastic sealing elements of sufficient rigidity to insure dimensionally stable and secure seals.

Another object of the invention is to provide a simplified method of preparing an extrudable polyvinyl chloride plastic composition in which the steps of masticating on rolls and shredding preparatory to extrusion are unnecessary. Other objects of the invention will be apparent to those skilled in the art as a reading of this specification proceeds.

In preparing the extrudable polyvinyl chloride plastic composition, the dry ingredients comprising a polyvinyl chloride composition such as, for example, polymers commercially available as "Geon RF-100" or "Geon 102" are first mixed thoroughly in a suitable mixer such as a Baker-Perkins type mixer. If it is desired to obtain transparent sealing elements, no pigments or fillers are added. However, for opaque or colored elements, fillers and pigments such as, for example, zinc oxide and green chrome oxide are mixed with the polyvinyl chloride composition. If transparent, colored sealing elements are desired, as where a problem of identification is involved, an organic dye may be added instead of the fillers or colored pigments. A stabilizer for the polyvinyl chloride resin may also be mixed with the other dry ingredients. The addition of a suitable stabilizer such as, for example, litharge or lead silicate in amounts of from about two to five percent by weight of the polyvinyl chloride resin has been found to be desirable for stabilizing the polyvinyl chloride during the extrusion of the plastic composition. Various ratios of fillers and colored pigments to polyvinyl chloride may be employed. However, particularly satisfactory results have been obtained when the ratio by weight of the filler and colored pigment to the resin is about one to one.

After the dry ingredients (ingredients not liquid at ordinary conditions of temperature and pressure) have been thoroughly mixed, a "temporary plasticizer" is added with continued mixing. The term "temporary plasticizer" as used herein refers to compounds or mixtures of compounds which are compatible with polyvinyl chloride resin and which may be removed in part or entirely, either during immersion in the dilater, or during operations after extrusion or application to the object to be sealed, without affecting the impervious nature of the sealing element. Such temporary plasticizers are to be distinguished from the ordinary type of high-boiling plasticizers which it is necessary to retain almost entirely in the plastic even after it has been molded into its final form.

In general, the plasticizers employed in the method of this invention comprise mixtures of a solvent for polyvinyl chloride resin and a non-solvent for the resin. Suitable solvents are ketones, for example, isophorone, mesityl oxide, fenchone, cyclohexanone, methyl butyl ketone, methyl isobutyl ketone, methyl amyl ketone, methyl isoamyl ketone, ethyl amyl ketone, etc. Suitable non-solvents are materials in which polyvinyl chloride is insoluble and, in addition, certain materials in which polyvinyl chloride is slightly soluble only at elevated temperatures. Examples of suitable non-solvents are aromatic hydrocarbons and halogenated aromatic hydrocarbons, for example, xylene, dichlorobenzene, monochlorotoluene, diethylbenzene, chlorinated xylenes, etc.

Various ratios of solvents to non-solvents may be employed in the temporary plasticizer. It has been found that when a solvent alone is added to the mixture of resin and filler as a plasticizer, a rubbery mass results which is difficult to work in the mixer and which cannot readily be handled in an extruder. However, by adding sufficient non-solvent to the mixture, the mass tends to form a gel-like product which is readily mixed and broken up into small particles that are easily handled in an extrusion machine or other forming device.

Various combinations of solvents and non-solvents may be employed. However, we have found that mixtures of isophorone and monochlorotoluene afford particularly good results when employed in accordance with the method of our invention. The ratio by weight of isophorone to monochlorotoluene should be preferably one part of isophorone to form approximately two to three parts of monochlorotoluene. The amount of temporary plasticizer added to dry ingredients may be varied depending, for example, on the shape of the sealing elements to be extruded. However, the addition of temporary plasticizer in amounts approximately equal by weight to the weight of polyvinyl chloride resin has been found to be suitable for most applications.

For certain applications it may be desirable to obtain sealing elements having less rigidity than that ultimately obtainable by employing compositions prepared in accordance with the method set forth above. More flexible sealing elements may be obtained by the addition of small quantities of high boiling plasticizers, e. g., tricresyl phosphate, dioctyl phthalate, etc., to the mass during the mixing operation.

After the dry ingredients and the plasticizer have been thoroughly mixed, and while continuing mixing sufficient heat is applied to the mixer to raise the temperature of the mass to from about 40° to 80° C. When the mass begins to stiffen up, it is cooled rapidly and mixing is continued until the mass is broken up into small rubbery curds. These curds can be stored for long periods of time without agglomerating into larger lumps. This is an advantage which cannot be obtained if the temporary plasticizer contains only compounds which are solvents for the polyvinyl chloride resin.

The plastic composition in the form of rubbery curds may be stored in drums for subsequent use, or it may be transferred directly to a forming device such as, for instance, an extruder, for forming into the desired shapes for sealing elements.

By employing temporary plasticizers such as, for example, an isophorone-monochlorotoluene mixture, it is possible to prepare an extrudable composition by ordinary mixing methods, thus eliminating the necessity for mixing on rolls which is normally incident to the preparation of compositions containing the usual high boiling plasticizers. In addition, the product is in the form of rubbery curds which are readily handled in the extruder without intermediate processing. In the method heretofore employed it has been necessary to put the sheet plastic from the masticating rolls through a shredding device before it can be handled by the extruder.

The extrudable composition in the form of small rubbery curds, as obtained by our method, is fed into the hopper of an extrusion machine and extruded at temperatures ranging from about 130° F. to 260° F., depending for example, on the particular composition employed, the wall thickness of the elements, etc. If sealing elements are desired in the form of short tubes or sleeves, the tubing is cut into the desired lengths by a suitable device, such as an automatic cutter as the tubing passes from the extrusion die onto the moving belt. Where sealing elements of the cup type are desired, the tubing may be pinched closed at intervals while hot, as it leaves the extruder. Any suitable arrangement such as a rotating cam may be employed to seal the tubing in this manner. It is obvious that various shapes of dies and devices for pinching and sealing the extruded shapes may be employed in forming the sealing elements.

After the sealing elements have been extruded and cut and sealed to the shape and dimensions necessary for sealing the opening for which they are intended, they are placed in a liquid dilater which causes the elements to expand sufficiently to enable them to be applied readily to the opening. The sealing elements need not be placed in the dilater immediately after forming and cutting but may be stored and dilated just previous to using.

Liquids which have been found to be effective as dilaters are mixtures containing a solvent for the polyvinyl chloride plastic and another compound in which the polyvinyl chloride is either insoluble or only slightly soluble at elevated temperatures. Examples of suitable solvents are ketones, e. g., acetone, methyl ethyl ketone, isophorone, etc. Examples of compounds in which polyvinyl chloride is insoluble or slightly soluble only at elevated temperatures are aromatic hydrocarbons, e. g., benzene, toluene, xylene, ethyl benzene, cumene, and chlorinated derivatives of such aromatic hydrocarbons. Particularly good results have been obtained by employing a dilater comprising a mixture of approximately 85% xylene and 15% methyl ethyl ketone by volume.

The sealing elements may be allowed to remain in the dilater for varying periods of time depending upon the amount of expansion necessary for subsequent application. However, when the above described mixture of xylene and methyl ethyl ketone is employed, nearly maximum swelling is obtained after about two hours' immersion. Longer immersion increases the swelling very little, and does not detract from the ultimate properties of the sealing element.

After the sealing element has been applied to the opening to be sealed, the dilater may be allowed to evaporate under ordinary room conditions of temperature and pressure, or the rate of evaporation may be increased by baking at elevated temperatures below the softening point of the resin. As hereinbefore indicated, the sealing elements shrink as the dilater escapes from the plastic composition, producing a tightly fitting seal.

In order that those skilled in the art may better understand how to practice our invention, the following examples are given for purpose of illustration and not by way of limitation:

Example 1

A pigmented plastic composition containing the following ingredients was prepared:

| | Parts by weight |
|---|---|
| Polyvinyl chloride resin (Geon RF 100) | 8000 |
| Zinc oxide | 8000 |
| Litharge | 160 |
| Monochlorotoluene | 5333 |
| Isophorone | 2667 |

The dry ingredients consisting of the polyvinyl chloride resin, zinc oxide and litharge were mixed together in a Baker-Perkins mixer and the mixture of monochlorotoluene and isophorone was then added. The result was a soft wet mix of about the consistency of stiff mortar. This was mixed for approximately ten minutes at room temperature without any visible change. Heat was then applied to the jacket of the mixer, and as the mixture warmed up to approximately 60° C., it became more fluid at first, and then quite rapidly began to gel and stiffen. At this point the heat to the jacket of the mixer was turned off and cold water was admitted to the jacket. The plastic mass advanced rapidly to a stiff rubber consistency, and as it continued to cool, began to break into small rubbery curds. After the mass had been broken up to the desired degree of fineness, the mixer was stopped and the finished compound, in the form of small rubbery curds, ready for extrusion, was removed.

In Example 1, the ratio of temporary plasticizer to resin is 1:1. In the following example this ratio is 0.75:1.

Example 2

A transparent extrudable composition was prepared as follows:

| | Parts by weight |
|---|---|
| Polyvinyl chloride resin (Geon 102) | 165 |
| 33 percent lead silicate (Geon "B" stabilizer in isophorone) | 15 |
| Isophorone | 30 |
| Monochlorotoluene | 90 |

The slurry of stabilizer was blended with the isophorone and monochlorotoluene and the mixture was then added to the polyvinyl chloride resin in the mixer. The resulting mixture was then mixed for a short time at a temperature of approximately 60° C., and as the mass began to stiffen it was cooled with continued mixing in the same manner as set forth in Example 1. Mixing of the chilled mass was continued until the mass was broken up into fine rubbery curds. The resulting extrudable composition was much lighter in density than the compound resulting in Example 1.

Example 3

The product of Example 1 was extruded in the form of a tube 0.225" in diameter. The tube was cut into two-inch segments. These segments, when immersed in a mixture of 85% (by volume) xylene and 15% (by volume) methyl ethyl ketone were swollen to a diameter of approximately 0.31". This dilated tube was used to join a 0.25" copper tube to a concentric 0.375" copper tube. The xylene and methyl ethyl ketone evaporated from the sealing tube, causing the sealing tube to grip tightly both of the copper tubes.

What we claim as new and desire to secure by Letters Patent of the United States is:

1. A method of preparing a readily extrudable plastic composition adapted for use in making dilatable sealing elements comprising mixing ingredients comprising 1 part polyvinyl chloride resin with from 0.75 to 1 part of a temporary plasticizer containing 1 part of a solvent and from 2 to 3 parts of a non-solvent for said resin, heating the resulting mass at a temperature of from 40 to 80° C. with continued mixing until the mass becomes a stiff gel, and cooling said mass with further mixing, whereby the mass is broken up into small, rubbery curds.

2. A method of preparing a readily extrudable plastic composition adapted for use in making dilatable sealing elements comprising mixing ingredients comprising 1 part polyvinyl chloride resin and a filler with from 0.75 to 1 part by weight of a temporary plasticizer containing 1 part isophorone and from 2 to 3 parts of a chlorinated aromatic hydrocarbon, heating the resulting mass at a temperature of from 40 to 80° C. with continued mixing until the mass becomes a stiff gel, and cooling said mass with further mixing, whereby the mass is broken up into small, rubbery curds.

3. A method of preparing a readily extrudable plastic composition adapted for use in making dilatable sealing elements comprising mixing ingredients comprising equal parts by weight of polyvinyl chloride resin and zinc oxide, and a stabilizer for said resin, with a temporary plasticizer containing two parts by weight of monochlorotoluene to one part of isophorone, said temporary plasticizer being in an amount equal by weight to said resin, heating the resulting mass with continued mixing at a temperature of about 60° C. until the mass becomes a stiff gel, and cooling said mass with further mixing, whereby the mass is broken up into small rubbery curds.

4. A dilatable sealing element composed of a plastic composition the resin component of which is a plasticized polyvinyl chloride resin containing from 0.75 to one part plasticizer for each part resin, said plasticizer comprising one part of isophorone and from 2 to 3 parts of a monochlorotoluene.

GLENNARD R. LUCAS.
RICHARD C. BRYAN.

REFERENCES CITED

The following references are of record in the file of this patent:

UNITED STATES PATENTS

| Number | Name | Date |
|---|---|---|
| 1,929,453 | Semon | Oct. 10, 1933 |
| 2,027,962 | Currie | Jan. 14, 1936 |
| 2,419,035 | Quinn et al. | Apr. 15, 1947 |